M. A. DEES.
PNEUMATIC TIRE.
APPLICATION FILED FEB. 1, 1911.
1,040,647.
Patented Oct. 8, 1912.
2 SHEETS—SHEET 1.
Fig. I.
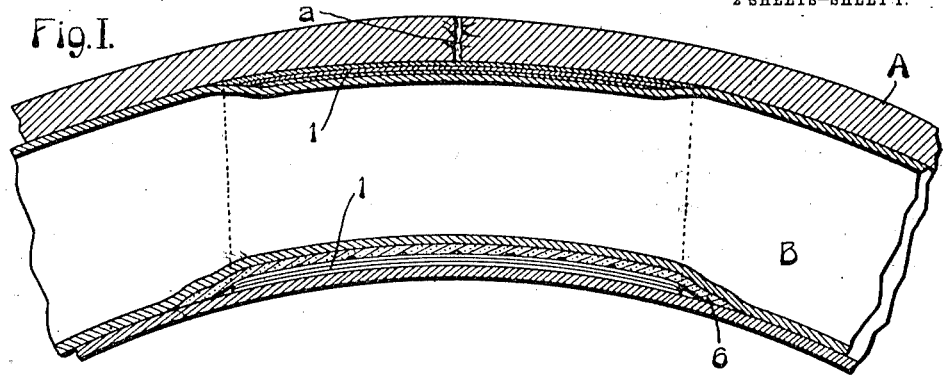
Fig. II.
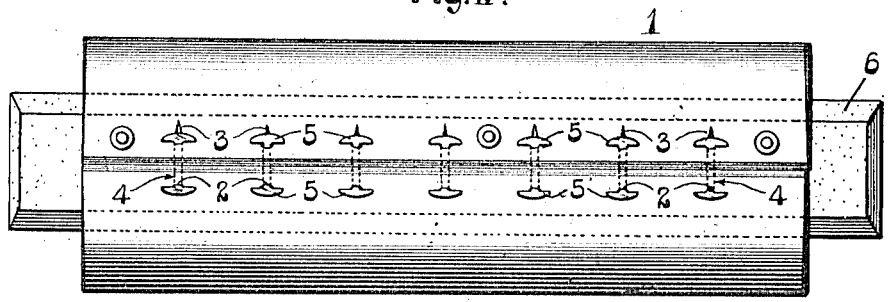
Fig. III.
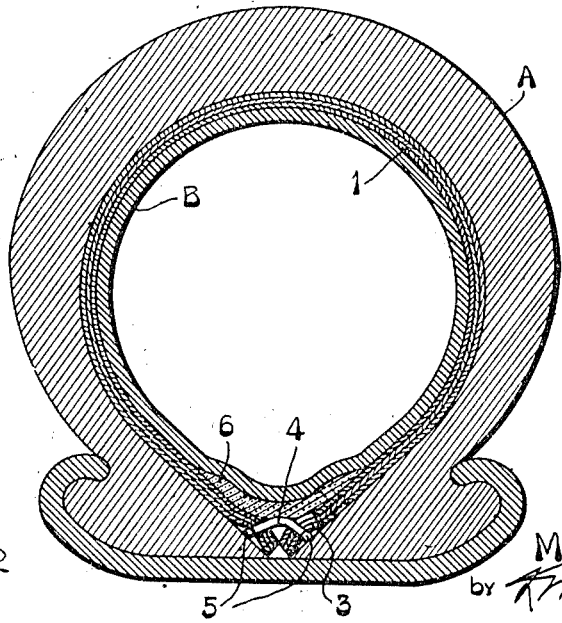
Attest
A. J. McCauley
E. B. Linn
Inventor:
M. A. Dees
by Knight & Cook
Att'ys.

M. A. DEES.
PNEUMATIC TIRE.
APPLICATION FILED FEB. 1, 1911.
1,040,647.
Patented Oct. 8, 1912.
2 SHEETS—SHEET 2.
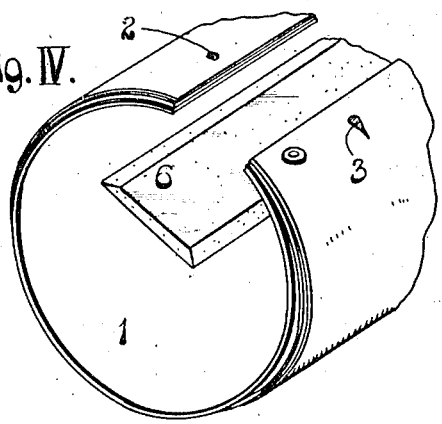
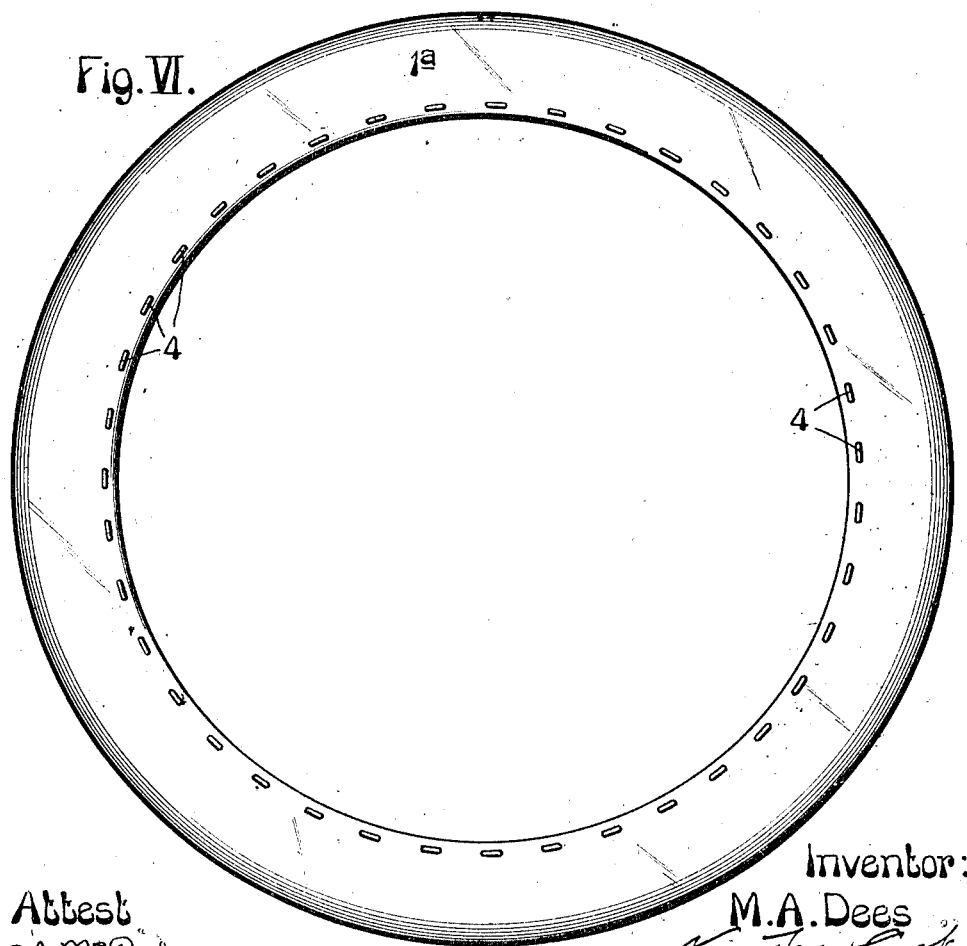
Inventor:
M. A. Dees

UNITED STATES PATENT OFFICE.

MARK A. DEES, OF PASCAGOULA, MISSISSIPPI, ASSIGNOR TO AMERICAN TIRE COMPANY, OF ST. LOUIS, MISSOURI, A CORPORATION OF MISSOURI.

PNEUMATIC TIRE.

1,040,647.  Specification of Letters Patent.  Patented Oct. 8, 1912.

Application filed February 1, 1911. Serial No. 605,884.

*To all whom it may concern:*

Be it known that I, MARK A. DEES, a citizen of the United States of America, residing at Pascagoula, in the county of Jackson and State of Mississippi, have invented certain new and useful Improvements in Pneumatic Tires, of which the following is a full, clear, and exact description, reference being had to the accompanying drawings, forming part of this specification.

My invention pertains to pneumatic tires and particularly to jackets for the protection of the inner tubes of such tires and the prevention of the expansion of such inner tubes through weakened or fractured portions of the tire casings, with the consequence of occurrence of what are known as "blowouts" of the inner tubes.

Figure I is a longitudinal section through a portion of a pneumatic tire containing a fracture or injury and one of my jackets within the tire. Fig. II is a view of the jacket looking at its edge portions, showing the fastening devices by which the edges of the jacket are held from separation. Fig. III is an enlarged cross section of the tire shown in Fig. I. Fig. IV is a perspective view of one end of the jacket with its edges separated, and without the fastening devices present therein. Fig. V is a perspective view of one of the fastening devices. Fig. VI is a side elevation of a continuous jacket made in accordance with my improvement.

In the accompanying drawings:—A designates the outer casing of my tire which may be similar in all respects to any pneumatic tire casing, inasmuch as no invention *per se* is herein claimed for such casing.

B is the inner tube within the outer casing and between which and the outer casing my jacket is utilized.

1 designates my jacket, which is preferably made of a plurality of layers of fabric that may be, and preferably are, rubberized. This jacket, as shown in Figs. I to IV, inclusive, is only intended to be utilized in a pneumatic tire for the protection of the inner tube at a point where the outer casing of the tire has been injured, such as that indicated at *a*. The jacket is in the form of a sleeve having longitudinal edges that may be separated from each other to permit of the application of the jacket around an inner tube of a pneumatic tire, and in the jacket adjacent to one of its longitudinal edges are non-circular perforations 2; while opposite these non-circular perforations and adjacent to the other longitudinal edge of the jacket are elongated tapered apertures 3 which extend transversely of the jacket and are pointed inwardly.

4 designates connecting or fastening devices by which the longitudinal edges of the jacket 1 are held in close assemblage and from separation from each other, when the jacket is in service around the inner tube of a pneumatic tire. Each of these connecting or fastening devices 4 is provided at its ends with segmental heads 5 and the rods are non-circular in cross section and bowed so that each connecting or fastening device 4 has two head carrying portions that are arranged at angles relative to each other.

In preparing my jacket for use in a pneumatic tire, the headed connecting or fastening devices 4 are mounted in the jacket at its edge containing the non-circular perforations 2, and inasmuch as these non-circular perforations through which the connecting or fastening devices 4 are passed are smaller than the heads thereof, said heads will remain in position until such time as the edges of the jacket are to be held in assemblage around an inner tube that is to be protected by the jacket. When the jacket is to be put into service, it is placed around the inner tube and the heads of the connecting or fastening devices 4 that are to be connected to the jacket at its edge opposite that in which the connecting or fastening devices were originally mounted are passed through the elongated tapered apertures 3, while such heads are turned at right angles to the peripheral face of the jacket, after which the connecting or fastening devices are turned to position their heads parallel with the peripheral face of the jacket, thereby preventing the repassage of the heads through the elongated tapered apertures 3. The connecting or fastening devices are, therefore, retained in the jacket to hold its longitudinal edges in close assemblage and prevent distention of the jacket. It will be apparent that the connecting or fastening devices may be disposed as frequently as desired throughout the length of the jacket in order that the jacket may not be capable of expanding to an objectionable degree between the points at which the connecting or fastening devices are located.

6 designates a protector flap secured to the jacket 1 adjacent to one of its longitudinal edges and adapted to extend across the junction of the connected longitudinal edges of the jacket to prevent injury to the inner tube B such as might occur by the inner tube expanding to such junction and becoming pinched therein. The protector flap 6 has another important office in the present improvement. The connecting rods 4 are bowed, as shown, toward the flap and the heads of said rods bear against the inner walls of the beads of the outer casing A. This being true, it will be appreciated that the pressure of the inner tube of the tire is directed against the protector flap and transmitted by the latter to the bows of the connecting rods, causing the heads of the rods to press laterally against the outer casing beads to hold them firmly in the seats provided therefor. The flap not only transmits the inner tube pressure for the purpose stated, but distributes such pressure evenly to all of the connecting rods in a manner that could not be accomplished if the inner tube pressed directly against the rods.

I have shown in Fig. VI a continuous jacket 1ª within which the inner tube of a tire may be housed instead of such tube being only partially housed, as it is in the use of the jacket 1. The separable edges of this continuous jacket are held in assemblage by the same form of connecting or fastening devices as are used in the jacket first described.

I claim:

1. A jacket of the character described having longitudinal edges, and double headed connecting devices having rods bent at their longitudinal centers and arranged in the jacket adjacent to its edges whereby said edges are held from separation; said jacket being provided with perforations adjacent to one of its edges within which the rods are closely fitted, and elongated inwardly tapered apertures adjacent its other edge through which the heads of the connecting devices may be passed after the latter are arranged in the jacket adjacent to the first mentioned edge.

2. In a pneumatic tire, an outer casing provided with beads, an inner tube within said outer casing, a jacket between said outer casing and inner tube, the said jacket having separable edges, headed connecting rods uniting the separable edges of said jacket and bearing against the beads of said outer casing, and a flap carried by said jacket interposed between said inner tube and said connecting rods.

MARK A. DEES.

In the presence of—
 EDNA B. LINN,
 A. J. MCCAULEY.